United States Patent
Katoh et al.

(10) Patent No.: US 6,886,177 B2
(45) Date of Patent: Apr. 26, 2005

(54) PHASE-CHANGE TYPE OPTICAL INFORMATION RECORDING MEDIUM

(75) Inventors: Masaki Katoh, Kanagawa (JP); Katsuyuki Yamada, Kanagawa (JP); Yuki Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 281 days.

(21) Appl. No.: 09/928,882

(22) Filed: Aug. 13, 2001

(65) Prior Publication Data

US 2002/0075789 A1 Jun. 20, 2002

(30) Foreign Application Priority Data

Aug. 14, 2000 (JP) ........................................ 2000-245602

(51) Int. Cl.[7] .............................................. G11B 7/24
(52) U.S. Cl. ..................................................... 720/718
(58) Field of Search ......................... 720/718; 369/272, 369/275.2; 430/270.13; 428/64.1

(56) References Cited

U.S. PATENT DOCUMENTS

| 5,276,670 A | 1/1994 | Nogami et al. ............. 369/116 |
| 5,498,507 A | 3/1996 | Handa et al. ............. 430/273.1 |
| 5,646,924 A | 7/1997 | Nonoyama et al. ....... 369/53.36 |
| 5,948,496 A * | 9/1999 | Kinoshita et al. ........... 428/64.1 |
| 6,426,936 B1 * | 7/2002 | Shinotsuka et al. ....... 369/275.2 |
| 2001/0003641 A1 * | 6/2001 | Kunitomo et al. ..... 430/270.13 |

FOREIGN PATENT DOCUMENTS

| EP | 1011101 A1 | 6/2000 |
| JP | 08106647 A * | 4/1996 |
| JP | 2000222776 A * | 8/2000 |

OTHER PUBLICATIONS

U.S. Appl. No. 09/793,131, filed Feb. 27, 2001.
U.S. Appl. No. 09/427,589, filed Oct. 27, 1999.
U.S. Appl. No. 09/270,108, filed Mar. 16, 1999.
U.S. Appl. No. 09/779,000, filed Feb. 7, 2001.

* cited by examiner

*Primary Examiner*—Tianjie Chen
(74) *Attorney, Agent, or Firm*—Cooper & Dunham LLP

(57) ABSTRACT

The phase-change type optical information recording medium includes a transparent substrate, a first protective layer on the substrate, a recording layer on the first protective layer, a second protective layer on the recording layer, and a reflective layer on the second protective layer. Assuming that minimum recording linear velocity is $V_1$ and maximum recording linear velocity is $V_2$, then a value of ratio $I(V_2)/I(V_1)$ of a degree of modulation corresponding to the maximum and minimum linear velocities is between 1 and 1.2.

12 Claims, 2 Drawing Sheets

5 REFLECTIVE LAYER
4 SECOND PROTECTIVE LAYER
3 RECORDING LAYER
2 FIRST PROTECTIVE LAYER
1 TRANSPARENT SUBSTRATE

- 5 REFLECTIVE LAYER
- 4 SECOND PROTECTIVE LAYER
- 3 RECORDING LAYER
- 2 FIRST PROTECTIVE LAYER
- 1 TRANSPARENT SUBSTRATE

PHASE-CHANGE TYPE OPTICAL INFORMATION RECORDING MEDIUM

FIELD OF THE INVENTION

The present invention relates to a phase-change type optical information recording medium that utilizes crystalline-amorphous phase transition or crystalline-crystalline phase transition for recording information.

BACKGROUND OF THE INVENTION

Conventionally, phase-change type optical information recording media have been known. In these phase-change type optical information recording media, a single laser beam is irradiated on a recording layer whereby the material of the recording medium undergoes crystalline-amorphous phase transition or crystalline-crystalline phase transition. This crystalline-amorphous phase transition or crystalline-crystalline phase transition is utilized to record, reproduce, or erase information repeatedly. Since overwriting of information can be conveniently performed with a single laser beam, development of this medium has been active lately.

Moreover, in recent years, computers are becoming faster and faster. Furthermore, amount of data handled by the computers are increasing day by day. To cope-up with the computers, the disk driving units which can perform recording, reproduction, or erasing of information at high-speed have been developed. However, still there are disk driving units those work at lower-speeds. Therefore, if same optical information recording media is to be used on variety of disk driving units, it is desirable that the optical information recording media have such recording and reproducing characteristics that they can be used at a wide speed range from the low to high speeds.

In case of the conventional phase-change type optical information recording medium, the recording and reproducing characteristics are optimized in such a manner that high degree of modulation can be obtained and the generated jitter is low even at high linear velocity, as well as generated jitter is low even after repetitive recording. However, if the characteristics of the phase-change type optical information recording medium are optimized in this manner, then there is a tendency that the characteristics of the recording signal at low linear velocity and after repetitive recording disadvantageously degrades.

SUMMARY OF THE INVENTION

It is an object of this invention to provide a phase-change type optical information recording medium having excellent recording and reproducing characteristics irrespective of the linear velocity.

The phase-change type optical information recording medium according to this invention comprises a transparent substrate; a first protective layer on said substrate; a recording layer on said first protective layer; a second protective layer on said recording layer; and a reflective layer on said second protective layer. Moreover, assuming that minimum recording linear velocity is $V_1$ and maximum recording linear velocity is $V_2$, and a degree of modulation at the time of reading out information is $I(V)$, a value of $I(V_2)/I(V_1)$ is within a range from 1 to 1.2.

When the phase-change type optical information recording medium has such a construction it is possible to obtain excellent recording and reproducing characteristics irrespective of the linear velocity.

Other objects and features of this invention will become apparent from the following description with reference to the accompanying drawings.

DESCRIPTION OF THE PREFERRED EMBODIMENTS

Embodiment of this invention will be explained below while referring to the accompanying diagrams.

Figure 1:
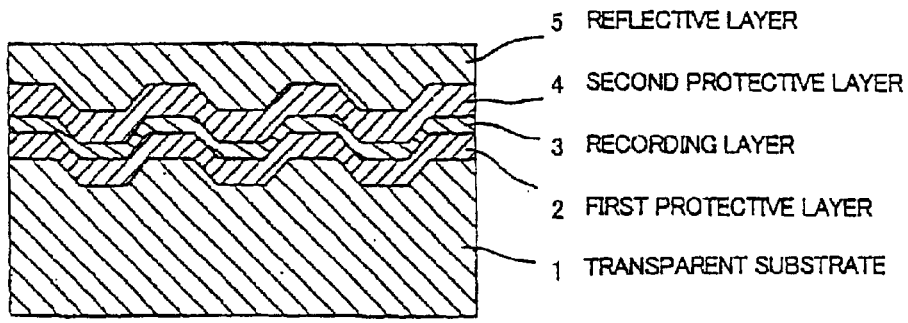
FIG. 1 is a cross-sectional view of the phase-change type optical information recording medium according to an embodiment of this invention.

FIG. 1 shows a cross-sectional view of the phase-change type optical information recording medium according to one embodiment of this invention. The legend 1 represents a transparent substrate, 3 represents a recording layer, 2 represents a first protective layer that protects the recording layer 3 from one side, 4 represents a second protective layer that protects the recording layer 3 from the other side, and 5 represents a reflective layer.

Exclusive experiments conducted by the inventor/s proved that the phase-change type optical information recording medium having excellent characteristics even in a range from low to high linear velocities can be obtained if the phase-change type optical information recording medium has a structure as explained below.

The phase-change type optical information recording medium was manufactured as follows. That is, a polycarbonate transparent substrate for CD-RW was used as the transparent substrate 1. A mixture of ZnS and $SiO_2$ was deposited on this transparent substrate 1 with a thickness of 80 nm to form the first protective layer 2. An alloy obtained by adding a very-very small amount of nitrogen to AgInSbTe was deposited on the first protective layer 2 with a thickness of 11 to 26 nm to form the recording layer 3. A mixture of ZnS and $SiO_2$, that is the same composition as that of the first protective layer 2, was deposited on the recording layer 3 with a thickness of 30 nm to form the second protective layer 4. An AlTi alloy was deposited on the second protective layer 4 with a thickness of 140 nm to form the reflective layer 5.

The transparent substrate 1 had circular shape with an outer diameter 120 mm, inner diameter 15 mm, and thickness 1.2 mm. The diameter and the thickness were chosen so as to satisfy the requirements described in the Part III of the Orange Book as the standard for CD-RW. The transparent substrate 1 had a continuous spiral guide groove. The guide groove has a width of 0.6 µm and depth of 30 nm. This transparent substrate 1 was produced through injection molding.

The first and second protective layers 2 and 4 may be formed using commercially available material generally used to form a protective layer for the optical disks. In this embodiment, the most popular material obtained by adding $SiO_2$ by 20 wt % to ZnS was used to form the first and second protective layers 2 and 4. Generally, sputtering method, which is an example of the vacuum film formation methods, is used for film formation. However, in this embodiment, since the material used had low conductivity, film formation was carried out by using the RF magnetron sputtering method. Alternating electric field is applied to the material in the RF magnetron sputtering method. Moreover, argon gas is used as the sputtering atmosphere.

The recording layer 3 was formed from AgInSbTe as the phase change material. The atomic composition of this material was set to values in the range as follows when expressed with $Ag_\alpha In_\beta Sb_\gamma Te_\delta$. Where $\alpha$, $\beta$, $\gamma$, and $\delta$ represent atomic percent and satisfy the relations:

$0.1 \leq \alpha \leq 2.0$, $3.0 \leq \beta \leq 8.0$, $65.0 \leq \gamma \leq 75.0$, $15.0 \leq \delta \leq 30.0$, and $97 \leq \alpha + \beta + \gamma + \delta \leq 100$.

The recording layer 3 was formed by using the DC magnetron sputtering method that is an example of the vacuum film formation methods. Sputtering was performed under the atmosphere of a mixture argon and $N_2$ gases. Argon and $N_2$ gases were mixed in a ratio 10:1. Finally, nitrogen was added to the recording layer.

The reflective layer 5 was formed from AlTi alloy obtained by adding titanium by 10% to aluminum. The reflective layer 5 was formed using the DC magnetron sputtering method. Although the film formation method is the same as in the case of the recording layer 3, sputtering was performed under the atmosphere of argon gas.

Finally, although not shown in FIG. 1, a resin overcoat layer was formed on the reflective layer 5 in order to protect the underlying layers from physical damage or thermal damage at the time of formatting or recording. Moreover, the overcoat layer prevents the underlying layers from corrosion. Generally, the overcoat layer is formed from ultraviolet setting resin. In this embodiment, commercially available ultraviolet setting resin for optical disks, that is SD 301 manufactured by Dainippon Ink Co., was used. The film formation was carried out by hardening resin applied by a spin coat method through irradiation of ultraviolet rays to the resin. The overcoat layer had a thickness from 8 to 10 $\mu$m.

The phase-change type optical information recording medium produced in the above manner was formatted by using a formatting device for CD-RW with a power of 650 mw and a linear velocity of 3.0 m/s, and information was recorded and reproduced by an ordinary CD-RW drive. As a result, satisfactory initial characteristics as explained below were obtained.

Overwriting characteristics were evaluated using the CD-RW evaluation machine 1000 manufactured by Pulse Tech Co.

The evaluation was carried out under the conditions of respective recording linear velocity of 4.8 m/s that is four times and recording linear velocity of 12.0 m/s that is 10 times the constant linear velocity of 1.2 m/s of a compact disc.

Information was recorded with signals encoded based on EFM used in the compact disc standard by using 2× and 4× recording stages described in the Orange Book (Part III, ver. 2.0) as the standard for rewritable CD (CD-RW).

The recording power (or writing power) Pw was selected in such a manner that 3T pit jitter at each recording linear velocity will become minimum. Moreover, erasing power Pe was selected in such a manner that 3T pit jitter after 1000-time overwriting will become minimum.

The recording power Pw values that satisfy the above-mentioned conditions are 14.0 mw, 18.0 mw, and 20.0 mw. On the other hand, the erasing power Pe values that satisfy the above-mentioned conditions are 7.0 mw, 8.0 mw, and 9.0 mw. The linear velocities under consideration are 4.8 m/s, 9.6 m/s, and 12.0 m/s.

Recordability was evaluated based on the degree of modulation, 3T land jitter, and 3T pit jitter. The characteristics after one-time to 1000-time overwriting had the degree of modulation of 0.55 or more and jitter of 35 ns or less. Thus, the characteristics satisfied the standards described in the Orange Book (Part III, ver. 2.0) for the CD-RW.

Figure 2:
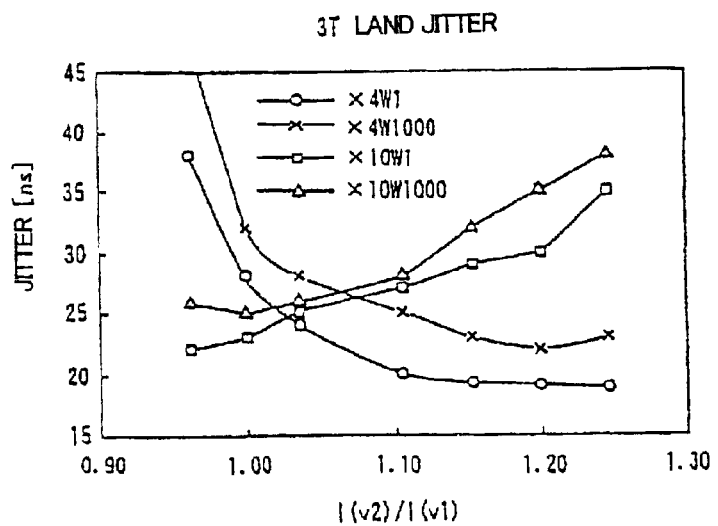
FIG. 2 shows the characteristics of 3T land jitter in this embodiment.
Figure 3:
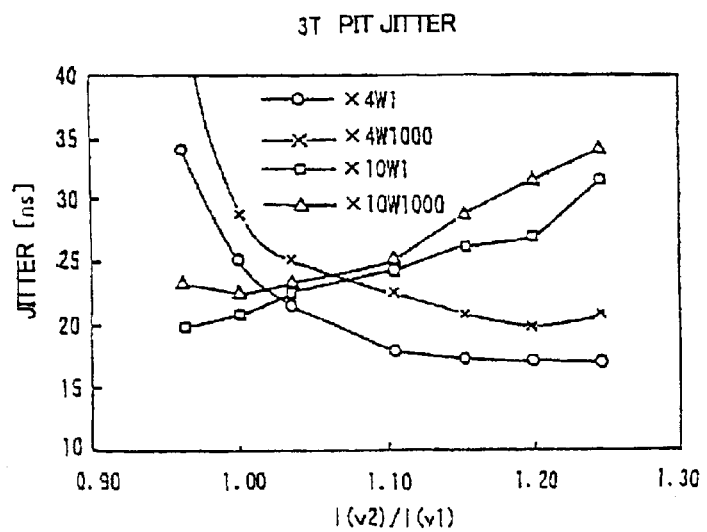
FIG. 3 shows the characteristics of 3T pit jitter in this embodiment.

The obtained characteristics are shown in FIG. 2 to FIG. 5. FIG. 2 is a graph that shows the characteristics of 3T land jitter, and FIG. 3 is a graph that shows the characteristics of 3T pit jitter. In these figures, jitter is plotted on the vertical axis and $I(V_2)/I(V_1)$ on the horizontal axis. Here, $V_2$ represents the maximum recording linear velocity ($V_2$=12.0 m/s), and $V_1$ represents the minimum recording linear velocity ($V_1$=4.8 m/s). Moreover, I(V) represents the degree of modulation at the recording linear velocity V. The recording linear velocity I(V) is defined as:

$I(V)$=(Maximum reflectance−Minimum reflectance)/(Maximum reflectance).

In the figures, X4W1 represents the characteristics after one overwriting at the linear velocity of 4.8 m/s, X4W1000 represents the characteristics after 1000-time overwriting at the linear velocity of 4.8 m/s, X10W1 represents the characteristics after one overwriting at the linear velocity of 12.0 m/s, and X10W1000 represents the characteristics after 1000-time overwriting at the linear velocity of 12.0 m/s.

The Orange Book (Part III, ver. 2.0) defines the standard for CD-RW. According to this book, jitter should be 35 ns or less and the degree of modulation should be 0.55 or more. In this embodiment, it will be determined whether the characteristics of the medium are satisfactory based on these values as reference.

Assume that the minimum recording linear velocity $V_1$ is 4.8 m/s (which corresponds to a quadruple speed of the reference linear velocity of CD) and the maximum recording linear velocity $V_2$ is 12.0 m/s (which corresponds to a tenfold speed of the reference linear velocity of CD). Respective values of 3T land jitter and 3T pit jitter after one-time and 1000-time overwriting with respect to a ratio of the modulation degree $I(V_2)/I(V_1)$ are shown in FIG. 2 and FIG. 3. The upper limit value of the jitter was set to 35 ns based on the upper limit value of the standard described in the Orange Book as a reference value. The range of $I(V_2)/I(V_1)$ was evaluated based on the upper limit value of the jitter.

Since the 3T land jitter tends to be higher than 3T pit jitter, it will be appropriate to give an attention to a relation between the 3T land jitter and the value of $I(V_2)/I(V_1)$. It is apparent from FIG. 3 that the jitter value after 1000-time overwriting tends to be higher irrespective of recording speeds.

At the minimum recording linear velocity $V_1$, the 3T land jitter after the overwriting tends to increase as $I(V_2)/I(V_1)$ becomes higher. In order to decrease the 3T land jitter to 35 ns or less, it is desirable that $I(V_2)/I(V_1) \leq 1.2$.

Further, at the maximum recording linear velocity $V_2$, the 3T land jitter after the overwriting tends to increase as $I(V_2)/I(V_1)$ becomes lower. In order to decrease the 3T land jitter to 35 ns or less, it is desirable that $I(V_2)/I(V_1) \geq 1.0$.

That is, when the recording linear velocity V satisfies the relation $V_1 \leq V \leq V_2$, the range where the characteristics after the overwriting will become excellent is as follows:

$$1.0 \leq I(V_2)/I(V_1) \leq 1.2$$

Therefore, $I(V_2)/I(V_1)$ has to be set to the range from 1.0 to 1.2 in order to satisfy the jitter value of 35 ns or less as the standard of the jitter characteristics.

Figure 4:
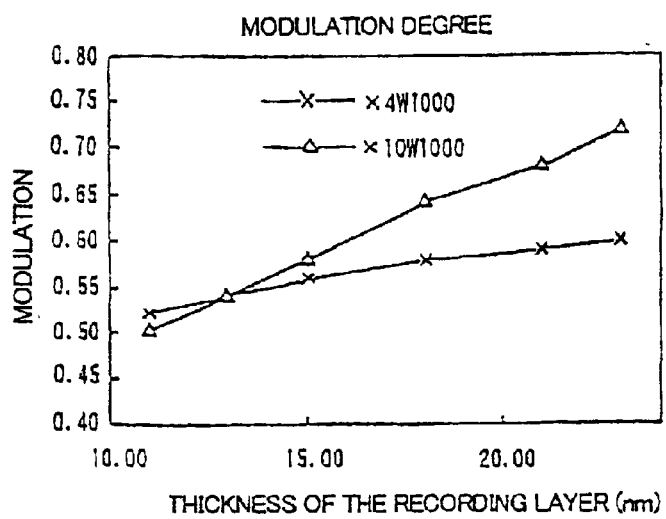
FIG. 4 is for explaining the dependence of the modulation degree on the thickness of the recording layer in this embodiment.

FIG. 4 shows the dependence of the modulation degree on the thickness of the recording layer 3. It is understood from this figure that the thicker the recording layer is, the higher modulation degree can be obtained in both of the recording at the minimum recording linear velocity $V_1$ and the recording at the maximum recording linear velocity $V_2$. However, the recording at the maximum recording linear velocity $V_2$ shows high dependence of the modulation degree on the thickness of the recording layer, while the recording at the minimum recording linear velocity $V_1$ shows low dependence of the modulation degree on the thickness of the recording layer. Further, the recording at the minimum recording linear velocity $V_1$ shows lower dependence when the thickness of the recording layer is 13 nm or more. In order to obtain excellent characteristics, the modulation degree of 0.55 or more is required irrespective of the recording conditions.

That is, as clear from FIG. 4, the thickness of the recording layer needs to be set to 13 nm or more so that the standard of degree of modulation, that is 0.55 or more, is satisfied.

The degree of modulation I(V) varies according to the recording linear velocity V, and also time depends on the film thickness of the recording layer and the material of the recording layer. Furthermore, the dependence also differs according to the linear velocity V. That is, degree of modulation $I(V_1)$ differs from degree of modulation $I(V_2)$ in their dependence on the film thickness of the recording layer and their dependence on the composition of the recording layer. For example, the maximum recording linear velocity $V_2$ has a high dependence on the thickness of the recording layer, while the minimum recording linear velocity $V_1$ has a low dependence on the thickness of the recording layer. Therefore, by appropriately setting the thickness of the recording layer, value of $I(V_1)/I(V_2)$ can be set to any in a desired range. Likewise, by altering the composition of the material to be used for the recording layer, the optimal range can be set because the dependence on the composition of the maximum recording linear velocity $V_2$ is different from that of the minimum recording linear velocity $V_1$.

Figure 5:
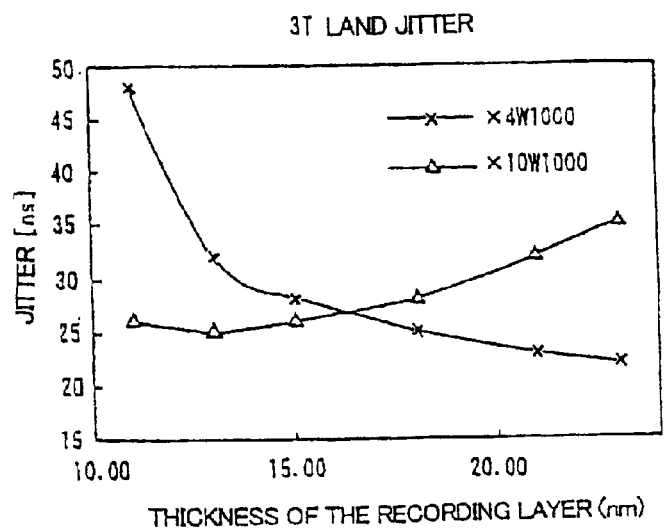
FIG. 5 shows the characteristics of 3T land jitter with respect to a film thickness of the recording layer in this embodiment.

FIG. 5 shows the characteristics of 3T land jitter with respect to the film thickness of the recording layer 3. It can be seen from the result of FIG. 4 that the thicker the recording layer is, the higher the degree of modulation, which makes the characteristics excellent. However, jitter show different behavior. The jitter after 1000-time overwriting at the minimum recording linear velocity $V_1$ becomes lower when the recording layer is thicker, which makes the characteristics excellent. On the other hand, the jitter after 1000-time overwriting at the maximum recording linear velocity $V_2$ tends to increase when the recording layer is thicker. As shown in FIG. 2 and FIG. 3, the jitter is required to be 35 ns or less. Therefore, the film thickness of the recording layer in this embodiment is preferably 21 nm or less.

That is, as apparent from FIG. 5, the thickness of the recording layer should be between 13 nm and 23 nm in order to decrease the 3T land jitter to 35 ns or less as the standard value.

The material of the transparent substrate 1 is required to be transparent in a region of recording and reading-out wavelength. Therefore, glass, ceramics, or resin is generally used as a substrate material. Particularly, a resin substrate is preferable in because it has higher moldability and low cost. Examples of such resin include, but not restricted to, polycarbonate resin, acrylic resin, epoxy resin, polystyrene resin, acrylonitrile-styrene copolymer resin, polyethylene resin, polypropylene resin, silicone base resin, fluorine base resin, ABS resin, and urethane resin. The polycarbonate resin and acrylic base resin are preferable because they have excellent moldability, optical characteristics, and low cost.

The thickness of the transparent substrate 1 is determined and employed so as to be a suitable one based on the parameters of the optical system of a recording and reproducing device. These parameters are, for example, focal length, number of apertures (NA), and recording or reproducing wavelength. More specifically, thickness of the transparent substrate 1 should preferably be between 1.1 mm and 1.3 mm when the phase-change type optical information recording medium is a CD-RW using polycarbonate resin, and should preferably be between 0.5 mm and 0.7 mm when the phase-change type optical information recording medium is a DVD disk using polycarbonate resin.

The phase change material of the recording layer 3 should preferably be an alloy base material which includes such an alloy base as GeTe, GeTeSe, GeTeS, GeSeSb, GeAsSe, InTe, SeTe, SeAs, Ge—Te— (Sn, Au, Pd), GeTeSeSb, GeTeSb, and AgInSbTe. Ratio of each alloy base should be optimized based on to the recording linear velocity. A desired element may be mixed as an impurity with the alloy base mainly containing any of the above-mentioned elements. The elements that may be mixed as the impurity include, but not restricted to, B, N, C, O, Si, P, S, Se, Al, Ti, Zr, V, Mn, Fe, Co, Ni, Cr, Cu, Zn, Sn, Pd, Pt, and Au.

Particularly, when the recording layer 3 is formed from AgInSbTe, the transition between the stable phase (i.e. the crystal line phase) formed by recording and the metastable phase (i.e. the amorphous phase) is clear. Therefore, it is suitable for a recording method based on a mark edge recording method, so that it is possible to take a wide margin for recording linear velocity by adding a very-very small amount of nitrogen as an impurity to the alloy.

When the recording layer 3 is formed from AgInSbTe, respective ranges as follows are preferable when each composition ratio of the component elements are expressed with $Ag_\alpha In_\beta Sb_\gamma Te_\delta$. Here, $\alpha$, $\beta$, $\gamma$, and $\delta$ represent atomic percent and satisfy the relations:

$$0.1 \leq \alpha \leq 5.0,$$
$$2.0 \leq \beta \leq 10.0,$$
$$60.0 \leq \gamma \leq 80.0,$$
$$10.0 \leq \delta \leq 40.0,$$
$$97 \leq \alpha + \beta + \gamma + \delta \leq 100,$$

and more preferably:

$$0.1 \leq \alpha \leq 2.0,$$
$$3.0 \leq \beta \leq 8.0,$$
$$65.0 \leq \gamma \leq 75.0,$$
$$15.0 \leq \delta \leq 30.0, \text{ and}$$
$$97 \leq \alpha + \beta + \gamma + \delta \leq 100.$$

Excellent characteristics are obtained at the recording linear velocity of 4.8 m/s or more when the above conditions are satisfied.

As explained above, the recording layer 3 is laminated through the vacuum film formation method. This vacuum film formation method includes the vacuum evaporation method, sputtering method, ion plating method, and the CVD method. Particularly, the sputtering method is preferable since it has high productivity and low cost.

The thickness of the recording layer 3 is required to be optimize from thermal characteristics such as specific heat or phase change temperature and from optical characteristics such as a refractive index, so that a range from 10 nm to 50 nm is desirable. The thickness of the recording layer 3 should preferably be between 10 nm and 30 nm in order to easily bring about the phase-change even with low energy. The overwriting characteristics are excellent when the thickness of the recording layer 3 is between 13 nm and 23 nm. Therefore, this thickness is more preferably as the thickness of the recording layer 3.

The first protective layer 2 and the second protective layer 4 protect the recording layer 3. The first protective layer 2 and the second protective layer 4 may be made from the same or different type of material. Best material may be selected in terms of the optical characteristics and the thermal characteristics. More specifically, such material include, but not restricted to, oxides such as $SiO_2$, $SiO$, $ZnO$, $SnO_2$, $TiO_2$, $In_2O_3$, $MgO$, or $ZrO_2$, nitrides such as $Si_3N_4$, AlN, TiN, BN, or ZrN, sulfides such as ZnS, $In_2S_3$, $TaS_4$, and carbides such as SiC, TaC, $B_4C$, WC, TiC, or ZrC, or diamond type carbon. Moreover, a simple derivative of these substances or a mixture of two or more of these substances can be used.

As explained above, the first protective layer 2 and the second protective layer 4 are laminated through the vacuum film formation method. This film formation method includes the vacuum evaporation method, sputtering method, ion plating method, and the CVD method. Particularly, the sputtering method is preferable since it has high productivity and low cost.

The thickness of the first protective layer 2 should preferably be between 50 nm and 150 nm. When the first protective layer 2 has such a thickness it prevents thermal damage of the substrate when recording is repeated several times. Furthermore, the thickness of the first protective layer 2 should more preferably be between 70 nm and 100 nm. It is possible to prevent the thermal damage of the substrate even with this thickness. In addition, since the thickness is less, lesser amount of material will be required when forming the layer, as well as the layer can be formed in shorter time.

The thickness of the second protective layer 4 should preferably be between 5 nm to 50 nm. When the second protective layer 4 has such a thickness it becomes possible to effectively increase the temperature of the recording layer 3 with the applied energy. Furthermore, the thickness of the second protective layer 4 should more preferably be between 10 nm and 40 nm. It is possible to perform phase change within 30 nw as an output range of laser for irradiation employed in the ordinary optical disk recording device even at this thickness.

The reflective layer 5 radiates heat produced due to reflection of laser beam and heat generated during the recording of information. Therefore, metal and alloys are used as its material. For example, there are Ag, Au, Al, or alloys obtained by mixing at least one of Ti, Si, Cr, Ta, Cu, Pd, and C with the metal. Considering thermal characteristics, optical characteristics, and productivity, an alloy containing aluminum as a main component is preferably used. The composition of the alloy and the thickness of the reflective layer 5 can set as desired. Best thickness can be determined and set based on the thermal characteristics and the optical characteristics.

The thickness of the reflective layer 5 should preferably be between 80 nm and 300 nm. When the reflective layer 5 has such a thickness the energy applied to an area adjacent to the recording layer during recording can be efficiently discharged, and at the same time, a reflectance of a medium by 10% or more can be obtained at the time of reproducing information. As a consequence, it is possible to obtain the phase-change type optical information recording medium with a high SN ratio. The thickness of the reflective layer 5 should more preferably be between 100 nm and 200 nm. When the reflective layer 5 has such a thickness, heat capacity of the medium can be set to an optimal range and repetitive recording characteristics can be kept in an excellent state.

Since reflectance is important for the optical characteristics of the reflective layer 5, the reflectance of the reflective layer 5 should preferably be 90% or more.

In order to cope with CAV recording currently in the mainstream, a recordable region in this CAV recording is from φ 50 mm to φ 126 mm. In order to satisfy this range, assuming that the minimum recording linear velocity (the innermost circumference) is $V_1$ and the maximum recording linear velocity (the outermost circumference) is $V_2$, it is desirable that the relation $V_2/V_1 \geq 2.5$ is satisfied. Further, in order to cope with a recording speed faster than a quadruple speed of CD-RW, it is desirable that $V_1 \geq 4.8$ m/s.

Further, in order to allow the CAV recording on the whole information region (recordable region) including read-in and read-out regions of φ 120-mm CD discs and DVD discs, it is desirable that $V_2/V_1 \geq 2.6$.

It is desirable that the recording power Pw is such that the initial jitter when recording is performed at each recording linear velocity is minimum. Similarly, it is desirable that the erasing power Pe is such that the jitter after overwriting is minimum.

Assuming that the maximum reflectance on reading out information is $I_{top}$, the minimum reflectance is $I_{bot}$, and the degree of modulation at the velocity V is I(V), I(V) is expressed by the equation $I(V)=(I_{top}(V)-I_{bot}(V))/I_{top}(V)$, and assuming that the degree of modulation at the minimum recording linear velocity $V_1$ is $I(V_1)$ and the degree of modulation at the maximum recording linear velocity $V_2$ is $I(V_2)$, then it is desirable that $I(V_2)/I(V_1)$ is between 1.0 and 1.2.

In order to enable reproduction of information on the optical information recoding medium like CD-RW by a commercially available driving unit, it is desirable that $I_{top} \geq 0.15$ and $I(V_1) \geq 0.55$.

A reproducing unit is used to reproduce information recorded in the phase-change type optical information recording medium. Reproduction is performed by scanning the medium with a focused laser beam. Detection of information is performed by detecting the intensity of a returned laser beam due to variation of local reflectance on the medium (variation of reflectance according to whether a recording mark is present or absent). That is, the reflectance on the medium is observed as the measured intensity I of the return beam.

In the phase-change type optical information recording medium, a recording mark is recorded as an amorphous part. Therefore, reflectance of the recording mark is lower than that of other regions. Since the recording mark is generally smaller as compared to the diameter of the reflected laser beam, the observed reflectance I fluctuates depending on the size of the recording mark. When marks are modulated based on mark length modulation, the reflectance at the time of reading out the longest recording mark becomes the lowest, which is represented by $I_{bot}$. Assume that a region with no mark is referred to as a land, the reflectance at the time of reading out the longest land is the highest, which is represented by $I_{top}$.

The reflectances $I_{bot}$ and $I_{top}$ depend on the velocity V during recording. The degree of modulation I(V) on recording at the recording velocity V is expressed by the following equation.

$$I(V) = (I_{top}(V) - I_{bot}(V))/I_{top}(V)$$

In order to obtain tracking precision and a high S/N ratio of the medium, $I_{top}$ should preferably be 10% or more, more preferably 13% or more, and further preferably 15% or more to form disks based on the CD-RW standard. By setting the degree of modulation I(V) to be higher, the S/N ratio of the medium can be improved. As a consequence, it is preferable to set the degree of modulation higher. However, if the degree of modulation is too high, average reflectance of the medium (which corresponds to a substantially average between $I_{top}$ and $I_{bot}$) disadvantageously becomes lower. Therefore, an appropriate range of the degree of modulation is between 0.3 and 0.8, and the range between 0.55 and 0.70 is preferable if the CD-RW standard are to be followed.

As explained above, in the phase-change type optical information recording medium according to this invention, assuming that the minimum recording linear velocity is $V_1$, the maximum recording linear velocity is $V_2$, and the degree of modulation on reading out information is I(V), the value of $I(V_2)/I(V_1)$ is within the range from 1 to 1.2. Therefore, it is possible to obtain excellent recording and reproducing characteristics within the wide range from the low linear velocity to the high linear velocity.

The present document incorporates by reference the entire contents of Japanese priority document, 2000-246502 filed in Japan on Aug. 14, 2000.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A phase-change type optical information recording medium comprising:

a transparent substrate; a first protective layer on the substrate; a recording layer on the first protective layer; a second protective layer on the recording layer; and a reflective layer on the second protective layer, wherein the recording layer includes as a main component $Ag_\alpha In_\beta Sb_\gamma Te_\delta$ where $\alpha$, $\beta$, $\gamma$, and $\delta$ represent atomic percents and satisfy the relations:

$0.1 \leq \alpha \leq 2.0$, $3.0 \leq \beta \leq 8.0$, $65.0 \leq \gamma \leq 75.0$, $15.0 \leq \delta \leq 30.0$, and $97 \leq \alpha + \beta + \gamma + \delta \leq 100$; and wherein assuming that a minimum recording linear velocity to be $V_1$, a maximum recording linear velocity to be $V_2$, and a degree of modulation at the time of reading out information to be I(V), then a value of $I(V_2)/I(V_1)$ is within a range from 1 to 1.2.

2. The phase-change type optical information recording medium according to claim 1, wherein a ratio between the maximum recording linear velocity $V_2$ and the minimum recording linear velocity $V_1$ is $V_2/V_1 \geq 2.5$.

3. The phase-change type optical information recording medium according to claim 1, wherein the minimum recording linear velocity $V_1$ is 4.8 m/s or more.

4. The phase-change type optical information recording medium according to claim 3, wherein the maximum recording linear velocity $V_2$ is 12.0 m/s or more.

5. The phase-change type optical information recording medium according to claim 1, wherein the AgInSbTe further contains nitrogen.

6. The phase-change type optical information recording medium according to claim 1, wherein a thickness of the recording layer is in a range from 13 nm to 23 nm.

7. A phase-change type optical information recording medium comprising at least one recording layer which records information based on crystalline-to-crystalline or crystalline-to-amorphous transition, the phase-change type optical information recording medium being rotated around a center of rotation when recording information in or reading information from said recording layer, wherein the recording layer includes as a main component $Ag_\alpha In_\beta Sb_\gamma Te_\delta$ where $\alpha$, $\beta$, $\gamma$, and $\delta$ represent atomic percents and satisfy the relations:

$0.1 \leq \alpha \leq 2.0$, $3.0 \leq \beta \leq 8.0$, $65.0 \leq \gamma \leq 75.0$, $15.0 \leq \delta \leq 30.0$, and $97 \leq \alpha + \beta + \gamma + \delta \leq 100$; and wherein when the minimum and maximum linear velocities of rotation are respectively $V_1$ and $V_2$, then a value of a degree of modulation corresponding to the maximum linear velocity $I(V_2)$ divided by a degree of modulation corresponding to the maximum linear velocity $I(V_1)$ is between 1 and 1.2.

8. The phase-change type optical information recording medium according to claim 7, wherein a ratio between the maximum recording linear velocity $V_2$ and the minimum recording linear velocity $V_1$ is $V_2/V_1 \geq 2.5$.

9. The phase-change type optical information recording medium according to claim 7, wherein the minimum recording linear velocity $V_1$ is 4.8 m/s or more.

10. The phase-change type optical information recording medium according to claim 9, wherein the maximum recording linear velocity $V_2$ is 12.0 m/s or more.

11. The phase-change type optical information recording medium according to claim 7, wherein the AgInSbTe further contains nitrogen.

12. The phase-change type optical information recording medium according to claim 7, wherein a thickness of the recording layer is in a range from 13 nm to 23 nm.

* * * * *